United States Patent [19]
Kido et al.

[11] Patent Number: 6,103,806
[45] Date of Patent: Aug. 15, 2000

[54] POLYIMIDE RESIN COMPOSITION

[75] Inventors: Hiroyasu Kido; Masaji Yoshimura; Yasunori Yoshida; Kayako Yanagihara, all of Kanagawa; Hideaki Oikawa, Fukuoka; Shoji Tamai; Tomohito Koba, both of Kanagawa, all of Japan

[73] Assignee: Mitsui Chemicals, Inc., Japan

[21] Appl. No.: 09/216,867

[22] Filed: Dec. 21, 1998

[51] Int. Cl.$^7$ ...................................................... C08L 79/08
[52] U.S. Cl. ........................ 524/449; 524/451; 524/495; 524/538; 525/432; 525/436
[58] Field of Search .................................. 525/436, 432; 524/449, 451, 495, 538

[56] References Cited

U.S. PATENT DOCUMENTS

| | | | |
|---|---|---|---|
| 4,847,311 | 7/1989 | Yamaya et al. | 524/413 |
| 4,847,349 | 7/1989 | Ohta et al. | 528/125 |

FOREIGN PATENT DOCUMENTS

| | | | |
|---|---|---|---|
| 0 267 289 | 5/1988 | European Pat. Off. . | |
| 0 292 243 | 11/1988 | European Pat. Off. . | |
| 0 313 407 | 4/1989 | European Pat. Off. . | |
| 0636661 | 1/1995 | European Pat. Off. | 525/432 |

OTHER PUBLICATIONS

B. Hsiao et al, Crystalline Homopolyimides and Copolyimides Derived from 3,3′,4,4′–Biphenyltetracarboxylic Dianhydride/1,3–Bis(4–aminophenyoxy)benzene/1,12–Dodecanediamine. 2. Crystallization, Melting, and Morphology, *Macromolecules*, 1996, 29, pp. 135–142.

*Primary Examiner*—Ana Woodward
*Attorney, Agent, or Firm*—Burns, Doane, Swecker & Mathis, L.L.P.

[57] ABSTRACT

A polyimide resin composition is disclosed herein which comprises 5 to 60% by weight of a polyimide [polyimide (1)] having a repeating unit represented by the chemical formula 1 and 40 to 95% by weight of a polyimide [polyimide (2)] having a repeating unit represented by the chemical formula 2. According to the present invention, there are provided a polymer alloy in which the advantages of the polyimide (1) and the polyimide (2) are utilized and the disadvantages of the polyimide (1) and the polyimide (2) are reduced; a polyimide resin composition from which crystalline molded articles can be obtained even by a usual molding cycle, for example, an injection molding cycle of about 30 to 60 seconds; and a polyimide resin composition from which molded articles having an excellent dimensional accuracy and flexural modulus can be obtained even by a usual molding cycle, for example, an injection molding cycle of about 30 to 60 seconds, for example, in the case that the molded articles are intended to be used at a high temperature of 230° C. or more, for example, a temperature of 230 to 300° C., or 230 to 250° C.

13 Claims, 1 Drawing Sheet

POLYIMIDE RESIN COMPOSITION

BACKGROUND OF THE INVENTION (i) Field of the Invention

The present invention relates to a resin composition suitable for the manufacture of molded articles which can express a high heat resistance, an excellent dimensional stability at a high temperature and an excellent flexural modulus at a high temperature, and molded articles obtained by molding the resin composition.

(ii) Description of the Related Art

Polyimide resins are usually much more excellent in heat resistance, mechanical properties and chemical resistance than conventional general-purpose engineering plastics, and they are considered to be one kind of superengineering plastic.

The polyimide resins can be classified into thermoplastic resins and thermosetting resins, but the former can easily be molded, and for this reason, their demand increases particularly in recent years.

The employment of the superengineering plastics is significant in that they can replace with metals which cannot be originally easily molded and have large specific gravities. Nowadays, from such a viewpoint, higher performances of heat resistance, dimensional accuracy and productivity than conventional levels have been desired, and an improvement which permits the expression of such performances has been expected.

Regarding a polyimide (1) having a repeating unit represented by the chemical formula 1:

The polyimide (1) having a repeating unit represented by the chemical formula 1 is disclosed in, for example, U.S. Pat. No. 4,847,311 (Japanese Patent Application Laid-Open No. 236858/1987) and U.S. Pat. No. 4,847,349 (Japanese Patent Application Laid-Open No. 68817/1987).

This polyimide (1) is crystalline, so that both of its glass transition point (about 245° C.) and melting point (about 388° C.) of the polyimide are high, and its heat resistance is in a top class among thermoplastic resins. Although being crystalline, however, this polyimide (1) has a low crystallization velocity, and in other words, a long period of time is required for the crystallization of the polyimide. Molded articles obtained by a usual molding cycle, for example, an injection molding cycle of about 30 to 60 seconds are amorphous.

Accordingly, the thus molded articles are excellent in characteristics of dimensional accuracy and flexural modulus, so long as they are used at a temperature lower than the glass transition point.

On the other hand, when the thus molded articles are used at a temperature higher than the glass transition point, the flexural modulus noticeably deteriorates, so that the shape of the molded articles cannot be maintained and hence it is difficult to continuously use them.

If it is attempted to continuously use the molded articles comprising this polyimide (1) at the temperature higher than the glass transition point, the amorphous molded articles should be subjected to a heat treatment to crystallize them. However, this crystallization causes a problem such as the noticeable dimensional change of the molded articles on occasion.

Regarding a polyimide (2) having a repeating unit represented by the chemical formula 2:

On the other hand, the polyimide (2) having a repeating unit represented by the chemical formula 2 is disclosed in, for example, Macromolecules, Vol. 29, p. 135 to 142 (1996).

This polyimide (2) is crystalline, and it has a large difference (about 205° C.) between a glass transition point (about 190° C.) and a melting point (about 395° C.). In addition, it has a very high crystallization velocity, and in other words, a period of time required for the crystallization is very short. In this connection, in the case of the polyimide (1), a difference between the glass transition point and the melting point (about 395° C.) is about 143° C.

This polyimide (2) is crystalline, and additionally, it has the very high crystallization velocity as described above. Therefore, in the molded articles obtained by a usual molding cycle, for example, an injection molding cycle of about 30 to 60 seconds, the crystallization has been substantially completed in the step of the molding, and even when the heat treatment is done, the dimensional change in the molded articles is slight.

In general, the resin having the high crystallization velocity possesses the high mobility of a molecular chain, so that the difference between the melting point and the glass transition point is large. That is to say, the glass transition point of the polyimide (2) is about 190° C., which is about 55° C. lower than that of the polyimide (1). Therefore, there occurs a problem that the flexural modulus, at a medial temperature of 150 to 200° C., of the molded articles comprising the polyimide (2) is lower than that of the molded articles comprising the polyimide (1) which is substantially amorphous and has the high glass transition point.

SUMMARY OF THE INVENTION

In view of the problems of the above-mentioned conventional techniques, an object of the present invention is to provide a polymer alloy in which the advantages of a polyimide (1) and a polyimide (2) are utilized and the disadvantages of the polyimide (1) and the polyimide (2) are reduced.

Another object of the present invention is to provide a polyimide resin composition from which crystalline molded articles can be obtained even by a usual molding cycle, for example, an injection molding cycle of about 30 to 60 seconds.

A still another object of the present invention is to provide a polyimide resin composition from which molded articles having an excellent dimensional accuracy can be obtained even by a usual molding cycle, for example, an injection molding cycle of about 30 to 60 seconds, for example, in the case that the molded articles are intended to be used at a high temperature of 230° C. or more, for example, a temperature of 230 to 300° C., or 230 to 250° C.

A further object of the present invention is to provide a polyimide resin composition from which molded articles having an excellent flexural modulus can be obtained even by a usual molding cycle, for example, an injection molding cycle of about 30 to 60 seconds, for example, in the case that the molded articles are intended to be used at a high temperature of 230° C. or more, for example, a temperature of 230 to 300° C., or 230 to 250° C.

The present inventors have intensively investigated with the intention of solving the above-mentioned problems, and as a result, it has been found that a composition obtained by mixing, in a specific ratio, two specific kinds of polyimides which are miscible in each other during melting can exert excellent performances. In consequence, the present invention has been completed on the basis of this knowledge.

That is to say, the present invention can be characterized by the following aspects.

1. The present invention is directed to a polyimide resin composition which comprises 5 to 60% by weight of a polyimide [polyimide (1)] having a repeating unit represented by the chemical formula 1 and 40 to 95% by weight of a polyimide [polyimide (2)] having a repeating unit represented by the chemical formula 2:

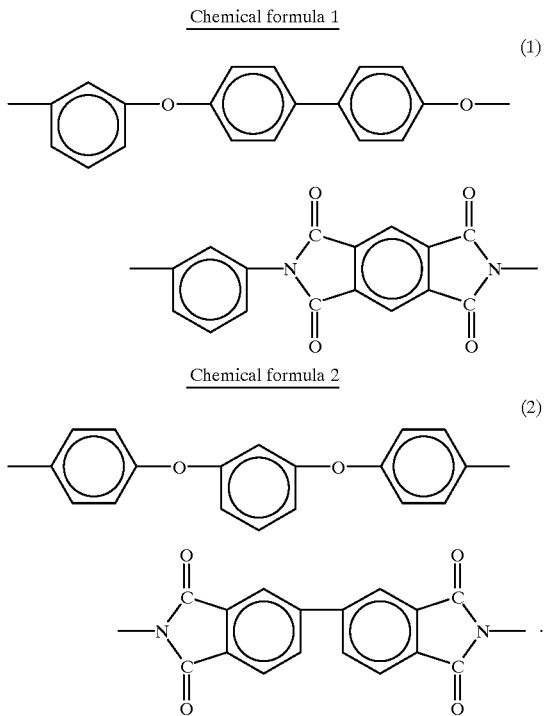

2. In the above-mentioned polyimide resin composition of the present invention, a half time of crystallization time is preferably 0.5 minute or less.

3. In the above-mentioned polyimide resin composition, 1 to 100 parts by weight of a filler are preferably added to 100 parts by weight of the polyimide resin composition described in the above-mentioned paragraph 1 or 2.

4. In the above-mentioned polyimide resin composition, 5 to 70 parts by weight of a filler are preferably added to 100 parts by weight of the polyimide resin composition described in the above-mentioned paragraph 1 or 2.

5. In the above-mentioned paragraph 3 or 4, the filler is preferably at least one selected from the group consisting of carbon fiber, carbon black, mica, talc and glass fiber.

6. In the above-mentioned paragraph 3 or 4, the filler is preferably the carbon fiber and/or the carbon black.

7. The present invention is also directed to molded articles which comprise the polyimide resin composition described in any one of the above-mentioned paragraphs 1 to 6.

8. The above-mentioned molded articles are characterized in that any exotherm of crystallization peak is not observed at 260 to 300° C., as differential scanning calorimetry (DSC) is carried out at a temperature rise rate of 10° C./min in a measurement temperature range of 20 to 420° C.

9. Examples of the above-mentioned molded articles include IC trays, electrical and electronic parts, office equipment parts, automobile parts and industrial machine parts.

DETAILED DESCRIPTION OF THE PREFERRED EMBODIMENTS

Polyimide (1)

Figure 1:
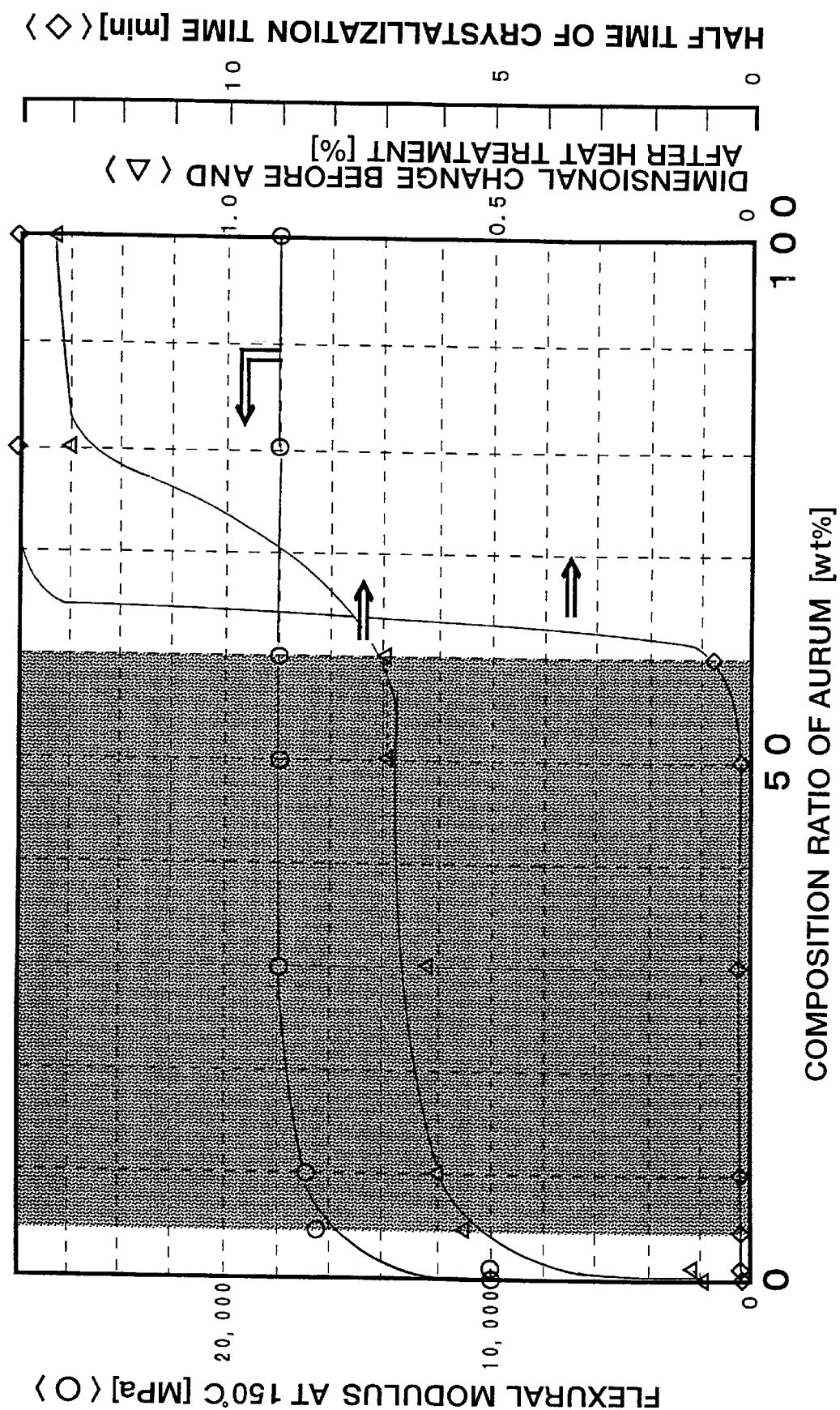
FIG. 1 shows a relation among Aurum composition ratios obtained in examples and comparative examples, flexural moduli at 150° C., dimensional changes before and after a heat treatment at 150° C., and half time of crystallization times.

No particular restriction is put on a process for preparing a polyimide (1) having a repeating unit represented by the chemical formula 1. For example, the polyimide (1) can be prepared by reacting 4,4'-bis(3-aminophenoxy)biphenyl with pyromellitic dianhydride in the presence or the absence of an organic solvent, and then chemically or thermally imidating the resultant polyamic acid.

The viscosity of this polyimide (1) is preferably in the range of 0.1 to 3.0 dl/g, more preferably 0.3 to 2.0 dl/g, most preferably 0.5 to 1.5 dl/g in terms of logarithmic viscosity.

If the logarithmic viscosity is less than 0.1 dl/g, mechanical properties are insufficient on occasion, and if it is in excess of 3.0 dl/g, flow ability is poor and the employment of injection molding is impossible sometimes.

Incidentally, the logarithmic viscosity referred to herein means a value obtained by the measurement at 35° C. after 0.50 g of the polyimide powder is added to and dissolved in 100 ml of a mixed solvent of p-chlorophenol/phenol (weight ratio=9/1).

This polyimide (1) has a glass transition point of about 245° C. and a melting point of about 388° C. in a preferred embodiment.

This polyimide (1) is commercially available under the trade name of Aurum (made by Mitsui Chemicals, Inc.).

Polyimide (2)

No particular restriction is put on a process for preparing a polyimide (2) having a repeating unit represented by the chemical formula 2. For example, the polyimide (2) can be prepared by reacting 1,3-bis(4-aminophenoxy)benzene with 3,3',4,4'-biphenyltetracarboxylic dianhydride in the presence or the absence of an organic solvent, and then chemically or thermally imidating the resultant polyamic acid.

The viscosity of this polyimide (2) is preferably in the range of 0.1 to 3.0 dl/g, more preferably 0.3 to 2.0 dl/g, most preferably 0.5 to 1.5 dl/g in terms of logarithmic viscosity.

If the logarithmic viscosity is less than 0.1 dl/g, mechanical properties are insufficient on occasion, and if it is in excess of 3.0 dl/g, flow ability is poor and the employment of injection molding is impossible sometimes. The logarithmic viscosity referred to herein is as defined above.

This polyimide (2) has a glass transition point of about 190° C. and a melting point of about 395° C. in a preferred embodiment.

Composition Ratio of the Polyimide:

The important specific requirement of the present invention resides in a mixing ratio (based on weight) between the polyimide (1) and the polyimide (2).

The mixing ratio of the polyimide (1)/the polyimide (2) is preferably in the range of 60/40 to 5/95, more preferably 50/50 to 10/90, most preferably 40/60 to 20/80 on the basis of weight. If the ratio of the polyimide (2) is less than 40% by weight, the molded articles obtained from such a composition cannot be used at 230° C. or more on occasion, and if it is in excess of 95% by weight, the flexural modulus in the range of 150 to 200° C. cannot be improved sometimes.

Features of the polyimide resin composition regarding the present invention:

The features of the polyimide resin composition regarding the present invention will be described as follows.

For example, in the case that the molded articles obtained from the composition are intended to be used at a high temperature of 150 to 250° C., much attention is paid to the flexural modulus from the viewpoint of maintaining the shape of the molded articles. That is to say, it is important to keep the flexural modulus at temperatures of from ordinary temperature to the high temperature at an average level to some extent and to thereby balance the flexural modulus with dimensional accuracy.

With regard to the polyimide (1), a time required for the crystallization is long, i.e., a crystallization velocity is low, and in the case of the usual injection molding, the amorphous molded articles alone are substantially obtained.

The usable temperature of such amorphous molded articles of the polyimide (1), i.e., a usual heat-resistant temperature depends on the glass transition point, and it is limited to about 230° C.

Even the molded articles having this heat-resistant temperature are considered to be fairly excellent, but a commercial demand increases. Thus, it is now required that the molded articles can be used at a high temperature of 230° C. or more, for example, at 230 to 300° C., or at 230 to 250° C. If the crystallization is accomplished by a heat treatment, the usable temperature depends on the melting point, but shrinkage increases with the crystallization, so that the dimensional accuracy cannot be satisfied any more. As understood from the foregoing, one advantage is accompanied with one disadvantage.

On the other hand, with regard to the polyimide (2), a time required for the crystallization is short, and the crystalline molded articles can be obtained from an initial stage. Even when these molded articles are subjected to the heat treatment, a dimensional change is slight. In general, the crystallization velocity depends on the mobility of a molecular chain, and in the same kind of polymers, the larger a temperature difference between the glass transition point and the melting point is, the higher the crystallization velocity is as a usual tendency. In fact, as compared to the polyimide (1), the melting point of the polyimide (2) is higher by 7° C. but the glass transition point is lower even by 55° C. In the polyimide (2), the crystallization can sufficiently proceed by the usual molding, but the flexural modulus at a temperature in the vicinity of the glass transition point such as 150 to 200° C. is conversely poorer than the polyimide (1).

Critical Meaning of the Composition Ratio:

The composition ratio of the polyimide resin composition regarding the present invention has a critical meaning. That is to say, only in the specific composition ratio, the functional effect of the present invention can be exerted.

The expression mechanism of the critical functional effect of the polyimide resin composition regarding the present invention is not always definite, but the consideration of the present inventors will be described as follows.

It can be presumed that the problems which are to be solved by the present invention can be solved by simply mixing the crystalline polyimide with the amorphous polyimide. However, such a presumption is wrong.

In a condition where the fine crystals of the crystalline resin float in the matrix of the amorphous resin, the effect of the present invention cannot be eventually obtained, and the crystallization of the crystalline resin is usually impaired.

In the embodiment of the present invention, the composition is molded via a heating/melting step as a premise. However, it is strongly implied from the results measured by differential scanning calorimetry (hereinafter abbreviated to "DSC") that the condition of the embodiment regarding the present invention is different from the condition where the fine crystals of the crystalline resin simply float in the matrix of the amorphous resin.

That is to say, when the molded articles of the polyimide (1) are heated from ambient temperature, the exothermic peak of the crystallization appears in the vicinity of 300° C. When the temperature is further raised, the exothermic peak of melting appears, but heat quantity at this time is about the same as the exotherm of the crystallization. That is to say, it can be understood that at the initial stage, the molded articles are not crystallized at all.

On the other hand, in the molded articles of the polyimide (2), the exotherm of the crystallization is not observed, and the endotherm alone of the melting appears. In addition, the heat quantity of this endothermic peak is equal to that in the case of the above-mentioned polyimide (1). In other words, the crystallization has been substantially completed at the initial stage.

In the molded articles of the resin composition according to the present invention, the exotherm of the crystallization does not appear, and the endotherm alone of the melting is observed and its heat quantity is substantially equal to that in the case of the single substance of the polyimide (1) or the polyimide (2). That is to say, in both the polyimide (1) and the polyimide (2) in the composition, the crystallization proceeds, and so it should be denied that the polyimide (2) alone crystallizes.

Therefore, "crystal plus crystal" properties can be obtained instead of "amorphous plus crystal" properties, and such properties can be considered to be causes to maintain the flexural modulus and to impart the balance between the flexural modulus and the shrinkage to the molded articles.

Both the polyimides are completely dissolved in each other in a melting/kneading step, and they are transparent, but in a cooling step, they are immediately crystallized to become turbid. That is to say, it can be presumed that by a spinodal phase separation in the cooling step and the crystallization of the polyimide (2), the molecules of the polyimide (1) are repelled out, so that a certain order is given to the molecular chain sequence of the polyimide (1) to facilitate the generation of crystal nuclei or to accelerate the feed of the molecular chain to a crystal growth surface, whereby the crystallization velocity of the polyimide (1) can be accelerated.

As understood from the foregoing, the above problems can be solved by combining the specific polyimides which are different from each other in the crystallization velocity, are completely compatibilized in the melting/kneading step, and are separated from each other in the cooling step. This constitution cannot be anticipated at all until now.

However, if the mixing ratio of the polyimide (1) is in excess of 60% by weight, any crystallization does not occur. That is to say, if the polyimide (2) is excessively diluted with the polyimide (1), the effect of the present invention is lost. In this case, the polyimides solidify while they are dissolved in each other in the transparent state, and the molded articles are prepared in the amorphous state.

The significance of this mixing ratio can also be understood from a half time of crystallization time obtained by an isothermal crystallization test using the DSC. The half time of crystallization time referred to herein has the following meaning, and it is a typical factor as a measure of the crystallization velocity.

The composition is heated to sufficiently melt it, and then quenched to a predetermined temperature, i.e., a temperature of the glass transition point or more and the melting point or less. A time of this point is represented by $t_0$. The composition is constantly kept at this temperature as it is, whereby the crystallization begins, and the exothermic peak of the crystallization is observed on the DSC. A time at which the peak top of this exothermic peak is given is represented by $t_1$.

Thus, a half time of crystallization time $t_h$ can be represented by the equation $$t_h = t_1 - t_0.$$

The measurement techniques of the half time of crystallization time are described in, for example, Macromolecules, Vol. 29, p. 135 to 142 (1996), "Polymer Measurement Method, the first volume", published by Baifukan Co., edited by The Society of Polymer Science (Japan), 1973, and "Netsu Sokutei" (Heat Measurement), Vol. 22, p. 16 (1995). The smaller the value of the half time of crystallization time is, the higher the crystallization velocity is. In general, this half time of crystallization time depends on the temperature for the crystallization, and it takes a minimum value at a temperature between the glass transition point and the melting point.

The minimum half time of crystallization time of the polyimide (1) can be obtained in the vicinity of 320° C., and it is about 15 minutes. On the other hand, that of the polyimide (2) can be obtained in the vicinity of 310° C., and it is about 0.2 minute. At a level less than this temperature, the half time of crystallization time is too short to be successfully measured. Anyhow, it is apparent that the half time of crystallization time of the polyimide (2) is shorter by about two digits than that of the polyimide (1), and the crystallization of the polyimide (2) is so fast.

Even the composition including less than 60% by weight of the polyimide (1) which is an embodiment of the present invention shows the half time of crystallization time of about the same digit as the single substance of the polyimide (2), and it is 0.5 minute or less. However, if the mixing ratio of the polyimide (1) is in excess of 60% by weight, the half time of crystallization time increases one digit or more. That is to say, the crystallization cannot be accomplished by the usual injection molding or the like sometimes.

Next, other embodiments of the present invention will be described.

No particular restriction is put on a filler which can be added to the polyimide resin composition regarding the present invention. Typical examples of the filler include inorganic reinforcements having forms such as fibers, needles, plates and grains.

Examples of the fibers include carbon fibers, glass fibers, metallic fibers, ceramic fibers, alumina fibers, boron fibers and silicon carbide fibers.

Examples of the needles include potassium titanate whiskers, aluminum borate whiskers, carbon whiskers, calcium carbonate whiskers, wollastonite, zinc oxide whiskers and titanium oxide whiskers.

Examples of the plates include mica, glass flakes, talc, sericite, kaolinite, boron nitride, graphite and metallic flakes.

Examples of the grains include magnesium carbonate, calcium carbonate, glass beads, silica, barium sulfate and metallic powders.

Other examples of the inorganic reinforcements include wear-resistant improvers such as quartzite powder and molybdenum disulfide, flame-retardant improvers such as antimony trioxide, aluminum hydroxide and magnesium hydroxide, a tracking-resistant improver such as asbestos, an acid-resistant improver such as calcium metasilicate, further, diatomaceous earth, alumina, shiratsu balloon, hydrated alumina, hydrotalcite, zeolite, various metallic oxides and carbon black, and they can be used in view of the improvement of various characteristics.

These inorganic reinforcements can be selectively used singly or in the form of a mixture of two or more, and the amount of the inorganic reinforcement to be used is in the range of 1 to 100 parts by weight, preferably 3 to 85 parts by weight, more preferably 5 to 70 parts by weight with respect to 100 parts by weight of the polyimide resin composition.

If the amount of the inorganic reinforcement is less than 1 part by weight, a reinforcing effect cannot be exerted sometimes, and if it is in excess of 100 parts by weight, the flow ability might be impaired during the molding sometimes.

To the polyimide resin composition regarding the present invention, a suitable amount of a certain resin can be added as a third component in compliance with a use purpose, so long as the object of the present invention is not impaired. No particular restriction is put on the kind of resin as the third component which can be added to the polyimide resin composition regarding the present invention.

A typical example of the resin as the third component is a thermoplastic resin. It is also possible to blend a suitable amount of the other thermoplastic resin in compliance with a use purpose. Examples of the thermoplastic resin which can be blended herein include polyolefins, polystyrenes, polycarbonates, polyesters, polyamides, polyamide-imides, polyphenylene ethers, polyacetals, polyarylates, polyphenylene sulfides, polysulfones, polyketones, polyether nitrites, liquid crystal polymers and polyimides having a structure which is different from that of the polyimides for use in the present invention.

Furthermore, fluororesins such as polytetrafluoroethylene and silicone resins, which are not thermoplastic, are very effective to improve mold release characteristics and wear/friction characteristics of the composition. In addition, an aromatic polyamide fiber is also preferable to improve mechanical properties. They can be selectively used singly or in the form of a mixture of two or more thereof.

Further, colorants, mold release agents, various stabilizers, plasticizers and oils can also be added to the polyimide resin composition, so long as the object of the present invention is not impaired.

The polyimide resin composition of the present invention can be continuously produced by uniformly mixing the polyimide (1), the polyimide (2) and other necessary components, and then extruding the mixture by the use of a single screw extruder or a multi-screw extruder. A batch system using a mixing roll, a kneader, a Brabender or the like is also practical.

The polyimide resin composition of the present invention can be molded mainly by injection molding, but it is also possible to utilize a known molding method such as extrusion molding, compression molding or transfer molding.

The thus obtained polyimide resin composition of the present invention is excellent in flexural modulus in a wide temperature range, can be controlled at a small range of the dimensional change of the molded articles, and can be particularly widely applied to the manufacture of the molded articles which are used at a high temperature of 230° C. or more and in which a high dimensional accuracy is required.

In the field of semiconductor containers, the polyimide resin composition of the present invention is useful for the manufacture of trays for transportation of IC packages, trays for an IC manufacturing process, IC sockets, wafer carriers and the like.

In the field of electrical and electronic parts, the polyimide resin composition of the present invention is useful for the manufacture of connectors, sockets, bobbins, and jigs for manufacture such as hard disk carriers, liquid crystal display carriers and trays for the manufacture of quartz oscillators.

In the field of office equipment parts, the polyimide resin composition of the present invention is useful for the manufacture of separating fingers for copying machines, heat insulating bearings for the copying machines, gears for the copying machines, and the like.

In the field of automobile parts, the polyimide resin composition of the present invention is useful for the manufacture of thrust washers, transmission rings, piston rings, oil seals rings and the like.

In the field of industrial machine parts, the polyimide resin composition of the present invention is useful for the manufacture of baring retainers, pump gears, conveyor chains, slide bushes for stretching machines and the like.

Next, the present invention will be described in more detail in accordance with examples, but the scope of the present invention should not be limited to these examples. Incidentally, the measurements of the physical properties and the evaluation of resins in the examples and comparative examples were made by the following procedures.

(A) Half Time of Crystallization Time

The method of measuring a half time of crystallization time has already been described hereinbefore.

That is to say, the half time of crystallization time is measured by an isothermal crystallization test using differential scanning calorimetry (DSC). The composition is heated to sufficiently melt it, and then quenched to a predetermined temperature. A time of this point is represented by $t_0$. The composition is constantly kept at this temperature as it is, whereby the crystallization begins, and the exothermic peak of the crystallization is observed on the DSC. A time at which the peak top of this exothermic peak is given is represented by $t_1$. Thus, a half time of crystallization time th can be represented by the equation $$t_h = t_1 - t_0.$$

The smaller the value of the half time of crystallization time is, the higher the crystallization velocity is. In general, this half time of crystallization time depends on the temperature for the crystallization, and it takes a minimum value at a temperature between the glass transition point and the melting point. Accordingly, a minimum half time of crystallization time of values measured changing the temperature from 190° C. to 320° C. is noted here. In the case that the half time of crystallization time is as short as less than 0.2 minute, the measurement is impossible, and hence the expression of <0.2 is given.

(B) Dimensional Change

A dumbbell of ASTM No. 1 (ASTMD-638) was subjected to a heat treatment at 300° C. for 2 hours, and widths of the parallel portion of the dumbbell were measured by a slide caliper before and after the treatment to observe a dimensional change.

(C) Flexural Modulus

For a specimen subjected to a heat treatment under the same conditions as in the above-mentioned paragraph (B), flexural modulus was measured changing temperatures in accordance with ASTMD-790. The measurement temperatures were 3 levels of 23° C., 150° C. and 250° C.

Preparation Example of the Polyimide (2)

In a container equipped with a stirrer, a reflux condenser and a nitrogen introducing tube were placed 204.4 g (0.7 mol) of 1,3-bis(4-aminophenoxy)benzene, 199.6 g (0.679 mol) of 3,3',4,4'-biphenyltetracarboxylic dianhydride, 6.22 g (0.06 mol) of phthalic anhydride and 1,480 g of m-cresol, and they were then heated up to 200° C. with stirring in a nitrogen atmosphere. Afterward, reaction was carried out at 200° C. for 4 hours, and at this time, the outflow of about 9 ml of water was confirmed. After completion of the reaction, the reaction solution was cooled to room temperature, and about 2,000 ml of toluene were then added thereto. Afterward, the powder of the resultant polyimide (2) was collected by filtration, and then dried. The logarithmic viscosity of the thus obtained polyimide (2) was 0.9 dl/g.

EXAMPLES 1 TO 5

A polyimide (1) (made by Mitsui Chemicals, Inc., trade name Aurum PD450, logarithmic viscosity=0.45 dl/g), the polyimide (2) obtained in the above-mentioned preparation example and carbon fiber (made by Toho Rayon Co., Ltd., trade name HTA-C6) were blended in each ratio shown in Table 1, followed by sufficient mixing by the use of a tumbling mixer. The mixture was molten, mixed and extruded at 420° C. at a screw revolving speed of 80 rpm by a twin-screw extruder having a screw diameter of 37 mm and L/D=32 to prepare pellets. For the thus prepared pellets, a half time of crystallization time was measured. Furthermore, these pellets were injection-molded at a cylinder temperature of 420° C. and a mold temperature of 210° C. for a molding cycle of 30 seconds, and the resultant specimen was then evaluated. The results are shown in Table 1.

Comparative Examples 1 and 2

Each mixing ratio between the polyimide (1) and the polyimide (2) was set in an unsuitable range, and evaluation was made by the same procedure as in Examples 1 to 3. The results are shown in Table 2.

Comparative Example 3

The single substance of the polyimide (1) was used, and evaluation was made by the same procedure as in Examples 1 to 3. The results are shown in Table 2.

Comparative Example 4

The single substance of the polyimide (2) was used, and evaluation was made by the same procedure as in Examples 1 to 3. The results are shown in Table 2.

In FIG. 1, there is shown a relation among Aurum composition ratios obtained in the examples and the comparative examples, flexural moduli at 150° C., dimensional changes before and after a heat treatment at 150° C., and half time of crystallization times.

TABLE 1

|  |  | Example | | | | |
|---|---|---|---|---|---|---|
|  |  | 1 | 2 | 3 | 4 | 5 |
| Composition (pts. wt.) | Polyimide Resin (1) | 5 | 10 | 30 | 50 | 60 |
|  | Polyimide Resin (2) | 95 | 90 | 70 | 50 | 40 |
|  | Carbon Fiber | 30 | 30 | 30 | 30 | 30 |
|  | Semi-Crystallization Time (min) | <0.2 | <0.2 | <0.2 | 0.4 | 0.5 |
|  | Dimensional Change (%) | 0.55 | 0.60 | 0.62 | 0.70 | 0.70 |
|  | Flexural Modulus (MPa) |  |  |  |  |  |
|  | 23° C. | 22000 | 22000 | 22000 | 23000 | 23500 |
|  | 150° C. | 16500 | 17000 | 18000 | 18000 | 18000 |
|  | 250° C. | 6500 | 7000 | 8200 | 8300 | 8500 |

TABLE 2

|  |  | Comparative Example | | | |
|---|---|---|---|---|---|
|  |  | 1 | 2 | 3 | 4 |
| Composition (pts. wt.) | Polyimide Resin (1) | 1 | 80 | 100 | 0 |
|  | Polyimide Resin (2) | 99 | 20 | 0 | 100 |
|  | Carbon Fiber | 30 | 30 | 30 | 30 |
|  | Semi-Crystallization Time (min) | <0.2 | 14.0 | 14.2 | <0.2 |
|  | Dimensional Change (%) | 0.12 | 1.30 | 1.33 | 0.10 |
|  | Flexural Modulus (MPa) |  |  |  |  |
|  | 23° C. | 20000 | 21000 | 21000 | 20000 |
|  | 150° C. | 10000 | 18000 | 18000 | 10000 |
|  | 250° C. | 4500 | 7500 | 8000 | 4400 |

The effects of the present invention are as follows.

The first effect of the present invention is to provide a polymer alloy in which the advantages of the polyimide (1) and the polyimide (2) are utilized and the disadvantages of the polyimide (1) and the polyimide (2) are reduced.

The second effect of the present invention is to provide a polyimide resin composition from which crystalline molded articles can be obtained even by a usual molding cycle, for example, an injection molding cycle of about 30 to 60 seconds.

The third effect of the present invention is to provide a polyimide resin composition from which molded articles having an excellent dimensional accuracy can be obtained even by a usual molding cycle, for example, an injection molding cycle of about 30 to 60 seconds, for example, in the case that the molded articles are intended to be used at a high temperature of 230° C. or more, for example, a temperature of 230 to 300° C., or 230 to 250° C.

The fourth effect of the present invention is to provide a polyimide resin composition from which molded articles having an excellent flexural modulus can be obtained even by a usual molding cycle, for example, an injection molding cycle of about 30 to 60 seconds, for example, in the case that the molded articles are intended to be used at a high temperature of 230° C. or more, for example, a temperature of 230 to 300° C., or 230 to 250° C.

What is claimed is:

1. A polyimide resin composition which comprises 5 to 60% by weight of polyimide (1) having a repeating unit represented by the chemical formula 1 and
    40 to 95% by weight of polyimide (2) having a repeating unit represented by the chemical formula 2, said weight percentages being based on the total weight of polyimide (1) and polyimide (2):

Chemical formula 1

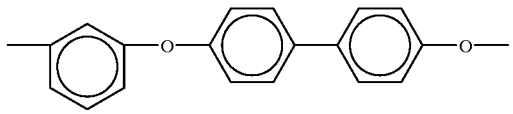
(1

Chemical formula 2

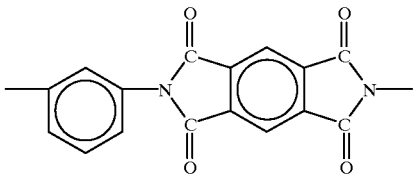
(2

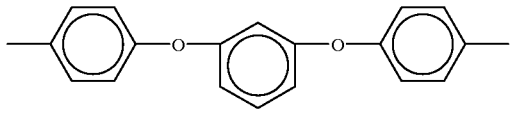

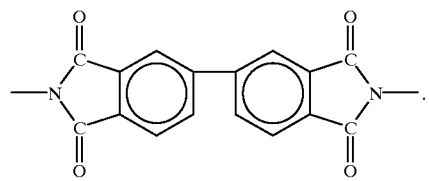

2. The polyimide resin composition according to claim 1 wherein the amounts of polyimide (1) and polyimide (2) provide a half time of crystallization time is 0.5 minute or less.

3. The polyimide resin composition according to claim 1 which contains 1 to 100 parts by weight of a filler with respect to 100 parts by weight of the polyimide resin composition.

4. The polyimide resin composition according to claim 3 which contains 5 to 70 parts by weight of a filler with respect to 100 parts by weight of the polyimide resin composition.

5. The polyimide resin composition according to claim 3 wherein the filler is at least one selected from the group consisting of carbon fiber, carbon black, mica, talc and glass fiber.

6. The polyimide resin composition according to claim 5 wherein the filler is the carbon fiber and/or the carbon black.

7. Molded articles which comprise the polyimide resin composition described in claim 3.

8. The molded articles according to claim 7 wherein any crystallization exothermic peak is not observed at 260 to 300° C., as differential scanning calorimetry (DSC) is carried out at a temperature rise rate of 10° C./min in a measurement temperature range of 20 to 420° C.

9. The molded articles according to claim 8 which are IC trays.

10. The molded articles according to claim 8 which are electrical or electronic parts.

11. The molded articles according to claim 8 which are office equipment parts.

12. The molded articles according to claim 8 which are automobile parts.

13. The molded articles according to claim 8 which are industrial machine parts.

* * * * *